US012649129B2

(12) United States Patent
Hyseni

(10) Patent No.: US 12,649,129 B2
(45) Date of Patent: Jun. 9, 2026

(54) CAVITATOR FOR GAS GENERATION

(71) Applicant: Kujtim Hyseni, Halmstad (SE)

(72) Inventor: Kujtim Hyseni, Halmstad (SE)

( * ) Notice: Subject to any disclaimer, the term of this patent is extended or adjusted under 35 U.S.C. 154(b) by 899 days.

(21) Appl. No.: 17/786,050

(22) PCT Filed: Dec. 17, 2020

(86) PCT No.: PCT/SE2020/051228
§ 371 (c)(1),
(2) Date: Jun. 16, 2022

(87) PCT Pub. No.: WO2021/126067
PCT Pub. Date: Jun. 24, 2021

(65) Prior Publication Data
US 2023/0027441 A1      Jan. 26, 2023

(30) Foreign Application Priority Data

Dec. 17, 2019   (SE) .................................... 1951483-5
Dec. 17, 2019   (SE) .................................... 1951485-0

(51) Int. Cl.
*B01F 27/272*          (2022.01)
*B01F 25/433*          (2022.01)
(Continued)

(52) U.S. Cl.
CPC .......... *B01F 25/4331* (2022.01); *B01F 25/64* (2022.01); *B01F 27/2721* (2022.01); *B01F 27/2722* (2022.01); *B01J 19/008* (2013.01)

(58) Field of Classification Search
CPC .... B01F 7/0075; B01F 7/008; B01F 7/00808; B01F 7/00816; B01F 7/00833;
(Continued)

(56) References Cited

U.S. PATENT DOCUMENTS 4,330,215 A  *  5/1982  Gale ....................... B29C 48/06
366/331
5,342,529 A      8/1994  Gabor
(Continued)

FOREIGN PATENT DOCUMENTS

AT               375107 B  *  7/1984
EP               3072579 A1 *  9/2016    .......... B01F 7/00808
(Continued)

OTHER PUBLICATIONS

Supplementary European Search Report for application PCT/SE2020/051228 prepared by the Hauge, date of completion of the search Jan. 19, 2024, 33 pages.
(Continued)

*Primary Examiner* — Charles Cooley
(74) *Attorney, Agent, or Firm* — Brooks Kushman P.C.

(57) ABSTRACT

A cavitator to be used in a gas generator is provided. The cavitator is provided with a cavitator inlet and a cavitator outlet having one or several cavitator channels having a cavitator channel inlet and a cavitator channel outlet. The cavitator channel or channels are further provided with wave shaped channel walls, protrusions and widenings, surface irregularities such as cavitation generating indentations or a combination thereof for inducing a differentiated pressure within a liquid flowing through the cavitators. The cavitator further having an outer cavitator stator and an inner cavitator rotor arranged to rotate by a liquid flow through the cavitator. The rotation of the inner cavitator rotor will induce a differentiated pressure within the liquid in the cavitator promoting cavitation in the liquid flowing through the cavitator channels. A gas generator including such a cavitator as described herein is also provided.

19 Claims, 7 Drawing Sheets

(51) Int. Cl.
*B01F 25/64* (2022.01)
*B01J 19/00* (2006.01)

(58) Field of Classification Search
CPC .......... B01F 7/00358; B01F 2215/0431; B01F 7/00775; B01F 7/00791; B01F 7/00758; B01F 7/00766; B01F 7/0085; B01F 7/00858; B01F 7/00866; B01F 7/00875; B01F 7/00633; B01F 2215/0036; B01F 2215/0427; B01F 2215/0459; B01F 2215/0481; B01F 25/4331; B01F 25/64; B01F 27/2721; C02F 1/34; C02F 2201/003; C02F 1/04; C02F 2103/08; A23C 3/00; A23L 3/0155; B01D 11/0226; B01D 11/0257; B01D 2011/002; B01D 3/08; B01J 19/0066; B01J 19/008; B01J 19/1806; B01J 2219/00765; B01J 2219/00779; B01J 8/0045; B01J 8/10; B01J 19/1818; A23V 2002/00; Y02A 20/144
USPC .......................... 366/286, 302, 304, 305, 306
See application file for complete search history.

(56) References Cited

U.S. PATENT DOCUMENTS

| | | | | |
|---|---|---|---|---|
| 5,450,368 A | * | 9/1995 | Kubota | ................... B29B 7/408 |
| | | | | 241/46.11 |
| 5,692,829 A | * | 12/1997 | Chiappa | ................... A23G 1/18 |
| | | | | 366/303 |
| 6,354,729 B1 | * | 3/2002 | Brown | ................ B01F 27/2724 |
| | | | | 366/307 |
| 7,490,976 B2 | * | 2/2009 | Bucher | ................... B02C 18/16 |
| | | | | 241/243 |
| 7,654,728 B2 | * | 2/2010 | Wood | .................... B01F 23/233 |
| | | | | 366/181.7 |
| 10,870,092 B2 | * | 12/2020 | Cavaglia' | .............. A23B 2/103 |
| 2009/0159461 A1 | | 6/2009 | McCutchen et al. | |
| 2016/0167983 A1 | | 6/2016 | Sirok | |
| 2016/0185624 A1 | * | 6/2016 | Miller | ....................... C02F 1/34 |
| | | | | 210/663 |
| 2017/0275187 A1 | | 9/2017 | Asami | |
| 2018/0265378 A1 | | 9/2018 | Dyos | |
| 2020/0139316 A1 | * | 5/2020 | Cavaglia' | ........... B01J 19/1818 |
| 2023/0027441 A1 | * | 1/2023 | Hyseni | ..................... C02F 1/34 |
| 2023/0356173 A1 | * | 11/2023 | Hyseni | ..................... C02F 1/34 |
| 2024/0391801 A1 | * | 11/2024 | Cox | ........................... C02F 1/34 |

FOREIGN PATENT DOCUMENTS

| | | |
|---|---|---|
| JP | 2007014924 A | 1/2007 |
| RU | 2699136 C2 | 9/2019 |

OTHER PUBLICATIONS

International Search report for PCT/SE2020/051228, prepared by the Patent -och registrering sverket mailing date Feb. 12, 2021, 5 pages.

* cited by examiner

305b

305a

305b

301

305a

302

1

115    113    114    111    112

CAVITATOR FOR GAS GENERATION

CROSS-REFERENCE TO RELATED APPLICATION

This application is the U.S. national phase of PCT Application No. PCT/SE2020/051228 filed on Dec. 17, 2020, which claims priority to SE Patent Application No. 1951483-5 filed on Dec. 17, 2019 and SE Patent Application No. 1951485-0 filed on Dec. 17, 2019, the disclosures of which are incorporated in their entirety by reference herein.

CROSS-REFERENCE TO RELATED APPLICATION

This application is the U.S. national phase of PCT Application No. PCT/SE2020/051228 filed on Dec. 17, 2020, which claims priority to SE Patent Application No. 1951483-5 filed on Dec. 17, 2019 and SE Patent Application No. 1951485-0 filed on Dec. 17, 2019, the disclosures of which are incorporated in their entirety by reference herein.

FIELD OF INVENTION

The invention relates to a cavitator for generating a gas by cavitation of a liquid, e.g. water. The invention also relates to a gas generator in which the cavitator is suitably used. The invention could for example be used for desalination of sea water.

BACKGROUND ART

Cavitation is a known method for gasification of liquids. Cavitation is generally referred to as the formation, growth and subsequent collapse of gas, e.g. vapour if water is used as the liquid, inside a liquid. In general, there is a need for causing rapid and local changes in the hydrostatic and hydrodynamic conditions of the liquid. There are different ways known to cause cavitation of liquid such as adding high levels of energy to the liquid by irradiation, e.g. by highly energetic waves such as laser light or high energy particles such as electrons, or by subjecting the liquid to high mechanical forces and stress. In general, the use of subjecting liquid to highly energetic irradiation is suitably used for small scale experiments but is costly to be used for industrial applications. Mechanically induced cavitation seems to be more promising in order to be used for large scale cavitation of liquids. In mechanically induced cavitation, the liquid to be treated is generally subjected to high flow speeds and guided through a flow path including flow guides and flow restrictions, e.g. venturi passages, in order to subject the liquid to the desired hydrostatic and hydrodynamic conditions.

Regardless of how changes in hydrodynamic conditions are caused, different types of constrictions may be employed to cavitate a fluid. However, movement of large volumes of fluid at the requisite speed through each of these constrictions to effect hydrodynamic cavitation requires high energy input. As a result, achieving cavitation induced evaporation from conventional hydrodynamic solutions remains imprac- tical and unreasonably expensive.

A device used for cavitation of liquids by mechanically inducing cavitation in a fluid or liquid is for example disclosed in US 2016/185 624 which describes a multi-stage cavitation assembly. The liquid or fluid is subjected to a first cavitation inducing feature followed by second cavitation feature which occurs after the fluid is subjected to flow guiding means slowing down the speed of the fluid and is directed to the second cavitation feature. The device described in US 2016/185 624 is described to be suitably used for fluid treatment such as water remediation.

DISCLOSURE OF INVENTION

The invention further relates to a cavitator which may be suitably used in a gas generator. The cavitator is provided with a cavitator inlet and a cavitator outlet for a liquid to be cavitated in the cavitator. The cavitator further comprises one or several cavitator channels having a cavitator channel inlet and a cavitator channel outlet. The cavitator channel or channels are designed with cavitation inducing means such as flow guiding or flow restricting means, bended or curved channels, wave shaped channel walls, protrusions and wid- enings, surface irregularities such as cavitation generating indentations or a combination thereof. The cavitation induc- ing means will contribute to provide a differentiated pressure within a liquid flowing through the cavitators. The cavitator further comprises an outer cavitator stator and an inner cavitator rotor arranged to rotate relative said outer cavitator stator. The cavitator is further designed to induce a rotation of the inner cavitator rotor by a liquid flow through the cavitator. The rotation of the inner cavitator rotor will in turn induce a differentiated pressure within the liquid in the cavitator promoting cavitation in the liquid flowing through the cavitator channels. Hence, the rotation of the rotor will together with the cavitation inducing means in the cavitator channels provide for a cavitation of a liquid flowing there through due to the inertia of the liquid and the centrifugal forces induced by the rotation of the main rotor body. As the liquid flows through the cavitator, the cavitator inducing means will cause a liquid flowing through the cavitators to change directions, at the macroscale or microscale, which will contribute to a differentiated pressure within the liquid in the cavitator.

The cavitator channel or channels may be designed to be wave-, saw tooth- or curvilinear shaped. According to a specific shape of the cavitator channel or channels, they are designed to be shaped as sinus curves. A sinusoidal shape has turned out to be advantageous in that it creates pressure difference in the cross-sectional and the longitudinal direc- tion of the channels so as to increase cavitation.

The cavitator channel or channels, which are running along the axis of rotation of the cavitator rotor, may be subdivided in an inner cavitator channel located closer to the axis of rotation of the cavitator rotor than a second outer cavitator channel. The first inner channel is formed between a first, innermost wall and a second, middle wall in the cavitator forming a first inner flow path for a fluid and the second, outer channel is formed between the second, middle wall and a third, outermost wall in the cavitator forming a second outer flow path for the fluid. The cavitator may be designed such that the inner wall and intermediate wall forms part of the cavitator rotor while the outer wall forms part of the cavitator stator.

In case the cavitator is designed with an inner and outer channel as disclosed above, there may be capillary vanes between the first inner channel and the second, outer chan- nel. The capillary vanes are small channels formed in the intermediate wall between the outer and inner cavitator channels which provides for fluid communication between the inner and outer cavitator channels.

The capillary vanes may be designed to function as jets for causing a rotational movement of the inner cavitator rotor. Hence, by designing the capillary vanes to not have a radial direction relative the axis of rotation, the flow of liquid through the capillary vanes may cause a rotational movement around the axis of rotation.

The capillary vanes could also be designed to increase cavitation for a liquid passing through the vanes. This may for example be achieved by designing the capillary vane inlet and outlet such that the capillary vane outlet is wider than the capillary vane inlet. Designing the capillary vane inlet more narrow than the capillary vane outlet will contribute to create a change of the pressure within the fluid passing through the capillary vanes. A liquid passing through the capillary vane and entering a narrow inlet and exiting a wider outlet will be subjected to a pressure decrease while flowing through the capillary vane and thus induce a cavitation of the liquid passing through the vane. The capillary vanes may be designed to have a step less change of the width, e.g. being funnel shaped, or designed to have an abrupt change of the width between the capillary vane inlet and the capillary vane outlet, e.g. by having a constant smaller capillary width in the inlet section and a constant, larger width of the outlet section.

In order to cause a liquid to flow through the capillary vanes could the first inner cavitator channel be provided with a dead end. The flow of liquid entering the inner cavitator channel inlet must thus to pass through the capillary vanes from the inner cavitator channel to the outer cavitator channel which is provided with an outlet opening. At least the inner cavitator channel will have an inlet opening and there may also be an inlet opening in the outer channel.

A cavitator comprising an inner and an outer cavitator channel may be designed such that said first, innermost wall and said second intermediate wall in the cavitator form part of said inner cavitator rotor while said, third, outer wall in the cavitator (3) forms part of said outer cavitator stator.

A cavitator designed with capillary vanes between the inner and outer channel for inducing a cavitation of the liquid passing through the capillary vanes should preferably be designed to avoid the cavitation of the liquid to erode the cavitator channels. Cavitation is a known phenomenon which erodes and ruins a material if it occurs on or adjacent to a surface, e.g. on boat propellers. The cavitator channels should thus be adapted such that the second outer cavitator channel is designed to have a width adapted to provide a sufficient distant for the gas bubbles formed by cavitation of the fluid, when flowing from the first inner cavitator channel via the capillary vanes to the second outer cavitator channel, to collapse inside the fluid before the cavitation bubbles reaches the outer wall of the second outer cavitator channel.

The invention also relates to a gas generator for gasification of liquids in which a cavitator as disclosed above may be suitably used. The liquid may for example be water such that vapour is produced in the gas generator. The gas generator may for example be used for vaporizing salt water in order desalinate the water to produce potable water. The gas generator comprises a main rotor body being rotatably mounted to a static support framework and the main rotor body is arranged to rotate around a rotor body main axis. The main rotor body comprises one or several rotor body channels having a rotor body channel inlet and a rotor body channel outlet. The channels are designed for guiding a flow of a liquid from the rotor body channel inlet, which is located at a distance $R1$ in the radial direction from the main axis, towards the rotor body channel outlet which is located at a distance $R2$ in the radial direction from the rotor body main axis. The rotor body channel outlet is located further away from the rotor body main axis than the rotor body channel inlet, i.e. $R2>R1$, such that a liquid in the rotor body is forced from the rotor body channel inlet towards the rotor body channel outlet by centrifugal forces as the main rotor body rotates around the main axis. Hence, the rotation of the main rotor body may be used to induce a pumping effect in the rotor body channel. The main rotor body further comprises one or several cavitators each one comprising one or several cavitator channels. The one or several cavitator channels are provided with a cavitator channel inlet and a cavitator channel outlet. The cavitator channel inlet is fluidly connected to the rotor body channel outlet for guiding the liquid flow to the cavitator for cavitation of the liquid. The cavitator channel inlet is preferably located closer to $R2$ than $R1$ and is preferably designed to be located in close vicinity to the rotor body channel outlet at a distance $R2$ from the main rotor body axle. In general, the cavitator channel and main rotor body channel are designed such that the flow from the rotor body channel outlet is directly transferred to the cavitator channel inlet in such a way that the complete flow from the rotor body outlet is forced to enter into the cavitator channel inlet. It is in general desired to locate the cavitator channel inlet at $R2$ as well, in particular it is desired to avoid that the cavitator channels have an extension such that the cavitator outlet will be positioned at a position considerably closer to the axis of rotation of the main rotor body than the cavitator outlets in order to avoid a liquid to be forced to travel in a direction against the centrifugal forces created by the rotation of the main rotor body. The cavitator channel is designed to comprise cavitation inducing means, e.g. flow guiding or restricting means, wave shaped channel walls, protrusions and widenings, bends, surface irregularities such as cavitation generating indentations or a combination thereof. The cavitation inducing means are present in order to induce a differentiated pressure within the liquid in the cavitator. A differentiated pressure will arise from the inertia of the liquid and the centrifugal forces due to the rotation of the main rotor body as the liquid pass through the cavitation inducing means in the cavitator channel so as to induce cavitation in the liquid flowing through the cavitator.

In general, it is an advantage to locate the cavitator with its cavitation inducing means at a distance from the axes of rotation of the main rotor body since the forces acting on a liquid at the same rotational speed will be stronger at a longer radial distance from the axes of rotation. The gas generator could thus be designed such that the rotor body channel is mainly designed to guide the liquid to be cavitated in the cavitator from an inlet at the axis of rotation or a radial distance $R1$ close to the axis of rotation to an outlet at a significantly longer radial distance $R2$ from the rotational axis of the main body without the aim of inducing cavitation. In the present arrangement, the rotor body channel will function mainly as a transport channel while also increasing pressure and flow rate of the liquid and the built up pressure in the main rotor body channel from the rotation of the main rotor body will be used in the cavitators for cavitation of the liquid.

Hence, the gas generator is designed to induce a fast flow of the liquid through the main rotor body and the cavitators by a fast rotation of the main rotor body in order to induce cavitation in the liquid flowing in the cavitator. The cavitation inducing means could for example include that a cavitator channel is designed to comprise several curves or bends, e.g. a wave shaped pattern, causing a liquid flowing through the cavitator channel to change directions so as to cause a differentiated pressure within the liquid in the cavitator. Using a curved channel, e.g. a wave shaped channel, may not usually have any major impact for inducing cavitation. However, at the very large speed the main rotor body is intended to rotate, e.g. having a rotational speed of 5 000 rpm up to 30 000 rpm, there will be a considerable impact from the change of directions of the channel and flow of fluid there through. By designing the channels with its curves and bends such that the change of directions will cause indifferent pressure profiles on a liquid flowing therein at different portions of the channel when subjected to the centrifugal forces from the rotation of the main rotor body will induce cavitation in the fluid. At certain locations in the channel, there will be compressive forces acting on the fluid and its molecules and particles. At other locations there will be forces acting to separate the liquid molecules and if these forces are made strong enough the formation of small bubbles will appear. These bubbles will generally implode shortly after they have been formed as long as the liquid is contained in a restricted environment such as the confined space of the cavitator channel. Hence, the strong forces enabling a differentiated pressure within the liquid in the cavitator arises from the inertia of the liquid and the centrifugal forces caused by the rotation of the main rotor body at a sufficiently high speed thereby causing the water flowing through the cavitator to cavitate when subjected to flow restrictors, bends or other cavitation inducing means.

The main rotor body is preferably designed to comprise a multitude of cavitators being located equidistant from each other and equidistant from the main rotor body rotational axis. A symmetric rotor is of importance due to the large forces arising from the high speed rotational motion of the main rotor body. Hence, there are preferably at least two equally designed cavitators comprised in the main rotor body being symmetrically located around the rotor body main axis.

The main rotor body may further be designed to comprise walls defining a rotatable container having an interior main rotor body space to which the vaporized liquid is released from the cavitators. The interior space of the main rotor body could be designed to be bell shaped. This design could also be described as being shaped as the lower half of an hour glass or as a truncated cone. This design could also be described as having a cross sectional area of the main rotor body perpendicular to its longitudinal axis which decreases towards the outlet at the top of the main rotor body. The main rotor body could for example be designed such that each cross section of the main rotor body perpendicular to the rotational axis forms a circular segment.

The main rotor body should have a rotational symmetric shape around its rotational axis in order to avoid unbalance in the main rotor body.

Even though it is disclosed above how a casing may be used for the gas generator and a specific shape of such a casing may be designed, the gas generator functions also without a casing or having a casing of another shape.

The main rotor body casing forming part of the main rotor body may be designed to have a main rotor body outlet at its upper portion. The main rotor body casing may be designed to have a reduced cross sectional area perpendicular to the rotor body centre axle in its upper part compared to a cross sectional area in lower part of the main rotor body casing, e.g. by designing the main rotor body casing such that the mean cross sectional area of the rotatable container formed by the main rotor body casing will decrease in along its length from the lower part to the upper part. This may for example be achieved by having a bell or cone shaped main rotor casing.

The gas generator may be designed such that the main rotor body is comprised in an inner casing forming part of the static support structure. The inner casing could be used as a pressure chamber in order to provide a vacuum or low pressure environment in which the main rotor body is rotating. By providing a low pressure environment will the frictional forces acting on the main rotor body while rotating be decreased.

If the gas generator comprises a main rotor body casing, the casing may be designed to comprise a main rotor body outlet which is adapted to cooperate and fit into an outer container space gas inlet. If the gas generator is further provided with an inner casing in which the main rotor body is located, the main rotor outlet could be designed to be comprised in an inner casing upper wall. The main rotor body outlet and the outer container space gas inlet may be designed such that the openings have an overlapping area. The outer container space gas inlet could be designed to have a larger cross sectional area than the main rotor body outlet such that there is a gap created between the outer container space gas inlet and the main rotor body outlet. By designing the gas generator in this way, it may be possible to use the flow of gas from the main rotor body space to create and maintain a vacuum or low pressure zone in the inner container space due to the venturi effect of the flowing gas.

The main rotor body space could further be designed to comprise a flow restrictor encircling the centre axle. The flow restrictor is intended to be located between the main rotor body gas feed openings, where gas produced in the cavitators enters the main rotor body space, and the main rotor body outlet. The purpose of including such a flow restrictor is to cause solid matter contained in the gas to be separated from the gas flow. Particles entrained in the gas flow will be separated from the gas flow by the impact of hitting the flow restrictor.

The main rotor body space could be designed to comprise main rotor drainage outlets. The drainage outlets could be located at in the bottom region of the main rotor body space, e.g. in a drainage reservoir running along the circumference at the bottom of the main rotor body space. The drainage outlets will discard solid matter which has been separated from the gas flow and fallen down to the bottom of the main rotor body space together with a portion of the fluid.

The gas generator could be designed to comprise a fixed outer casing in which the fixed inner casing is comprised. The fixed inner casing defining an inner container space could be used as a vacuum or low pressure chamber for the main rotor body. The flow of gas produced by the cavitators could be guided from main rotor body via an outer container space gas inlet to the outer container space. The outer container space may thus function as a reservoir for gas produced by the cavitators.

The outer container space may further comprise liquid supply conduits in which liquid to be fed to the main rotor body is preheated by the gas generated in the main rotor body flowing through the outer container space. The system can be controlled such that the gas flowing through the outer container space is cooled down to condense in the outer container space. The condensed gas may be collected from the outer container space via an outer container space outlet in order to be collected in tanks or further distributed via a piping system.

In order to establish a flow of liquid to be supplied to the gas generator, the main rotor body may be designed as a pump unit such as a screw pump or Archimedean screw. A screw pump will provide for a pumping effect when the main rotor body rotates in order to pump a liquid from a liquid supply reservoir via pump channels forming part of the main rotor body channels when the main rotor body is rotating. The pumping of liquid could of course be achieved by any other kind of pumping arrangement if desired.

The main rotor body is preferably designed to include at least two cavitators in order to balance the rotating main body. Any kind of cavitators could be used in order to produce gas from cavitating the liquid. A particularly useful kind of cavitators to be used in the gas generator is designed to have an inner cavitator rotor arranged to rotate relative an outer cavitator stator.

The rotational movement of the cavitator rotor may be achieved by designing the cavitator to induce a rotational movement by the water flowing through the cavitator from the cavitator inlet to the cavitator outlet. One way of achieving a propelling force for rotating the cavitator rotor is to design the cavitator rotor with turbine blades. Still another way of producing a rotational movement is to design cavitator channels to direct the flowing liquid to provide a rotational force.

In case cavitators having a cavitator rotor and a cavitator stator is used, they can be arranged in the main rotor body such that their axis of rotation are essentially perpendicular to the main rotor body centre axle being the axis of rotation of the main rotor body. The cavitators can also be arranged such that their axis of rotation is essentially perpendicular to the radial direction of the main rotor body centre axle. In case the axis of rotation of the cavitator fulfils both the above described criteria, the axis of rotation will be essentially parallel to the tangential direction of the circle along which the cavitator rotates around the main rotor body centre axle. However, a cavitator could also be designed such that its axis of rotation is parallel with the main rotor body axle. In general it is desired to design the arrangement such that the centrifugal forces from the rotation of a cavitator and the rotation around the main rotor body centre axle are designed to have positions where the centrifugal forces cooperate and work in the same direction while there are other positions in the cavitator where the centrifugal forces counteract each other in order to induce large pressure differences within a liquid in the cavitator.

The cavitator could be arranged such that the cavitator inlet is arranged at or close to the leading end of the cavitator and said cavitator outlet arranged at or close to the trailing edge of the cavitators when the cavitators rotates with the main rotor body. In this case the flow of liquid through the cavitator will contribute to the propulsive force for rotating the main rotor body.

The gas generator described above discloses different features of how a gas generator according to the invention may be designed. However, there are many different ways to design a gas generator within the scope of the invention. The basic principle is to provide a main rotor body with cavitators rotating with the main rotor body.

DETAILED DESCRIPTION OF INVENTION

Figure 1A:
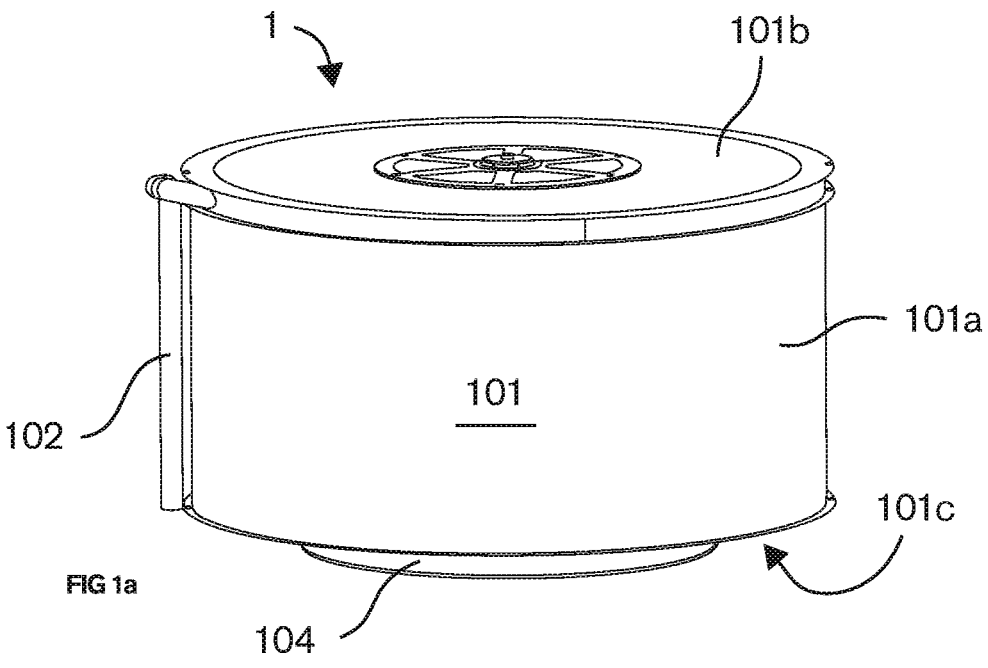
FIGS. 1a, 1b, 1c, and 1d disclose an embodiment of a gas generator.

In FIGS. 1a, 1b, 1c, and 1d is disclosed an example of a gas generator 1 according to the invention. The gas generator 1 exemplified in FIGS. 1a, 1b, 1c, and 1d comprises an outer casing 101 forming part of a static support framework. In this case is the outer casing 101 designed as a cylinder having an envelope surface 101a, an upper wall 101b and a bottom wall 101c defining a container space inside the outer casing 101. The static support structure further comprises a liquid supply conduit 102 for supply of a liquid to the gas generator 1. The liquid is guided from the liquid supply conduit 102 to a liquid supply reservoir 104 via the space inside the outer casing.

Figure 1B:
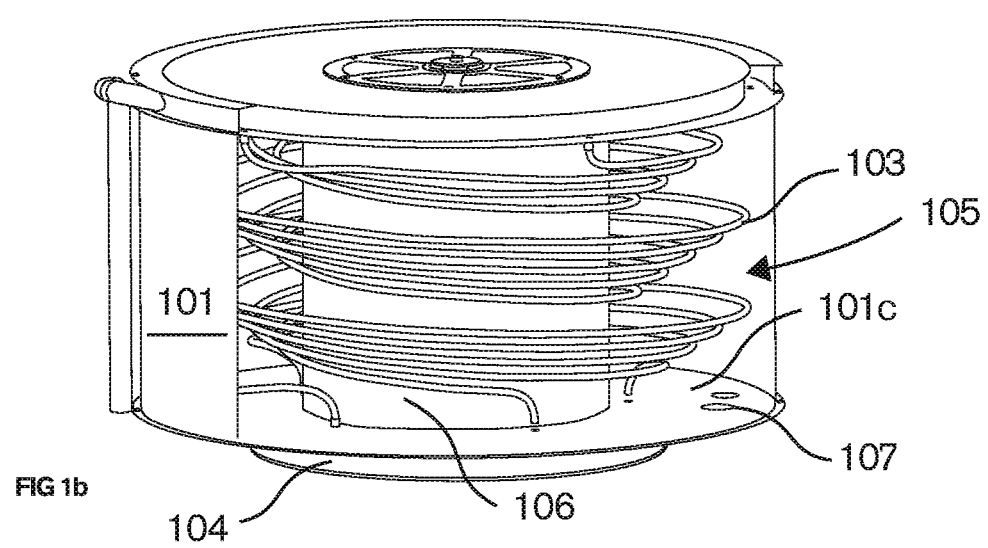

In FIG. 1b a portion of the envelope surface 101a has been removed in order to reveal the interior of the outer casing 101. Inside the outer casing 101 is an outer container space 105 formed between the outer casing 101 and an inner casing 106. The inner casing 106 also have a generally cylindrical shape. In the outer container space 105 are provided transfer conduits 103. The transfer conduits 103 are preferably designed and made from a material having high heat conductivity in order to provide for an efficient heat exchange between the liquid inside the transfer conduits and the outer container space 105. It is further provided at least one outer container space outlet 107 in the bottom wall 101c of the outer casing 101 in the outer container space 105. The outer space container outlet 107 will serve as an outlet for gas produced in the gas generator 1 which will condense in the outer container space 105.

Figure 1C:
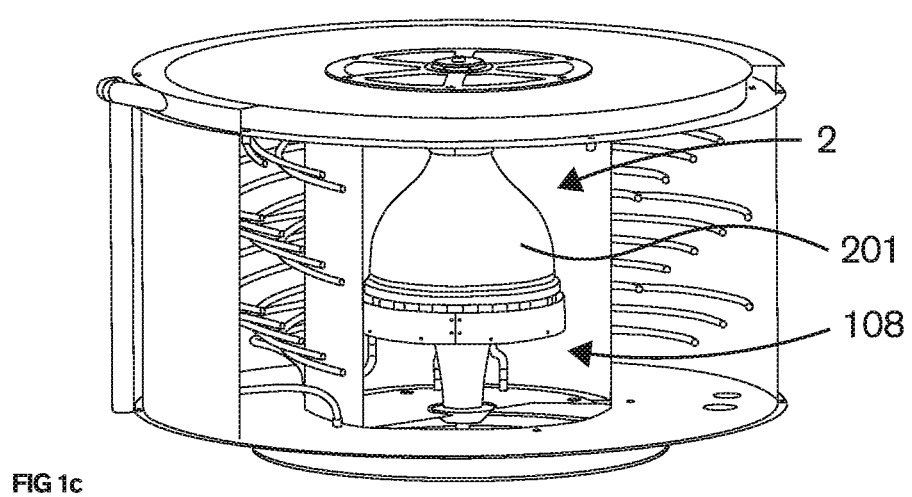

In FIG. 1c a portion of the envelope surface of the inner casing 106 has been removed in order to reveal the inside of the inner casing 106 defining an inner container space 108. In the inner container space 108 is provided a main rotor body 2 comprising a main rotor body casing 201. The main rotor body casing 201 is bell shaped. The main rotor body 2 is arranged to rotate along an axis along the longitudinal extension of the cylinder shaped inner and outer casings 106, 101. When referring to the rotational axis of the main rotor body in this description, the axis will be referred to as the Y-axis.

Figure 1D:
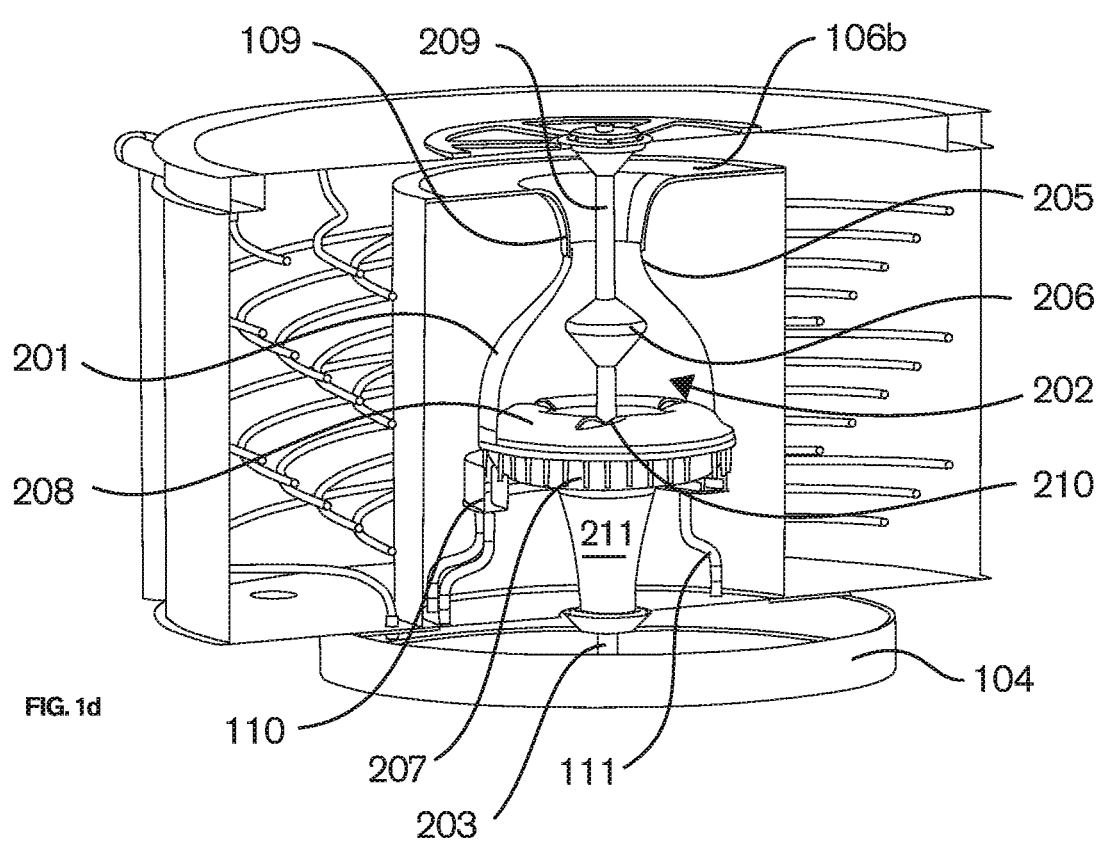

In FIG. 1d a portion of the main rotor body casing 201 has been removed in order to reveal the interior of the main rotor body casing 201 defining a main rotor space 202. It is inside the main rotor space 202 where the cavitators 3 (see FIGS. 2a, 2b, and 2c and FIGS. 3a, 3b, 3c, 3d, 3e, and 3f) are located and where the liquid is transformed from liquid to gas. Liquid is guided from the liquid supply reservoir 104 beneath the outer casing 101 via a rotor body channel 203 having a rotor body channel inlet 204 connected to the liquid supply reservoir 104. The liquid will further be guided via the rotor body channel 203 to cavitators (not shown) comprised in a toroidal casing 208. The liquid will cavitate and be gasified in the cavitators 3 and finally leave the toroidal casing 208 via the main rotor body gas feed openings 210 in the toroidal casing 208. The gas flowing through the main rotor body gas feed openings 210 in the toroidal casing will flow towards a main rotor body outlet 205. The main rotor body outlet 205 has a circular cross sectional opening which is adapted to fit into an outer container space gas inlet 109 which is formed in an upper wall 106b of the inner casing 106. The outer container space gas inlet 109 is funnel shaped and designed to encircle the main rotor body outlet 205 and preferably designed such that the outer container space gas inlet 109 overlap the main rotor body outlet 205 in the axial direction. There should be a gap between the outer container space gas inlet 109 and the main rotor body outlet 205. The gap will not only prevent any undesired contact and friction between the rotating main rotor body 2 and the stationary outer container space gas inlet 109 but also this design will contribute to a venturi effect when gas at high speed flows through the main rotor body outlet 205. This flow will strive to withdraw air from the inner container space 108 such that an under pressure or vacuum is created in the inner container space 108. The under pressure created in the inner container space 108 will thus contribute to a desired lower frictional loss when the main rotor body 2 is rotating at very high speeds.

In FIG. 1*d* is also disclosed a centrally located flow restrictor 206. The flow restrictor 206 will, together with the funnel shaped walls of the main rotor body casing 201, form a flow restriction for the gas flow in the passage from the main rotor body gas feed openings 210 in the toroidal casing to the main rotor body outlet 205. This restricting arrangement will cause particulate matter, even very small particles such as salt, to be subject to centrifugal forces arising from hitting the flow restrictor 206 or the walls of the main rotor body casing 201 which will make them deviate from forming part of the main flow of gas directed to the main rotor body outlet 205 such that there will essentially only be gas leaving the main rotor space 202 while particles and some of the gas will be falling down towards the bottom of the main rotor space, essentially along the walls of the main rotor body casing 202. In case the gas generator 1 is used for desalination of salt water, there will be vapour essentially free from any salt (and other particles) leaving the main rotor body outlet 205 while there will be a concentrated brine flowing along the walls of the main rotor body casing 201.

The general flow of a liquid to be gasified and thereafter condensed once more while impurities are removed may be briefly described with reference to FIGS. 1*a*, 1*b*, *c*, and I*d* as follows. A liquid enters into the gas generator 1 from a liquid supply conduit 102 to a liquid supply reservoir 104 via transfer conduits 103 located in the outer container space. The liquid will be guided from the liquid supply reservoir 104 to the main rotor body 2 via a main rotor body channel 203 and guided to cavitators (not shown) which will gasify the liquid by cavitation. The liquid flowing thorough the transfer conduits 103 will be preheated by heat exchange in the outer container space 105 with the gas produced by the gasified liquid from the main rotor body 2. The gasified liquid is flowing out from the main rotor space 202 via main rotor body outlet and 205 and outer container space gas inlet 107 to the outer container space 105. As the gas will condense in the outer container space 105, it will fall down to the bottom wall of the outer casing 101*c* wherefrom the condensed gas is guided via the outer container space outlet 107 to a desired tank or reservoir. The impurities from the liquid, together with some of the liquid which not follow the gas flow from the main rotor space 202 will flow towards the bottom of the main rotor space 202 where there are one or several main rotor drainage outlets 207 for draining the liquid separated from the gas. The main rotor drainage outlets 207 are guiding the liquid to a drainage collector 110 in the inner container space 108 which is provided with liquid waste conduits 111 for removal of the waste liquid from the main rotor body 2.

Figure 2A:
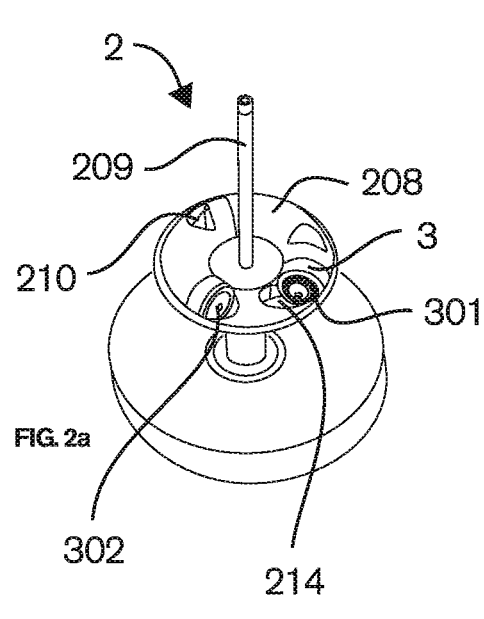
FIGS. 2a, 2b, and 2c disclose embodiments of a main rotor body.

In FIG. 2*a* is shown a main rotor body 2 where the main rotor body casing 201 has been removed to disclose the design on the inside of the main rotor body 2. The main rotor body 2 comprises a circular toroidal casing 208 which rotates around a centre axle 209 which will correspond to the Y-axis in the following schematically description of the rotational arrangement below. There are three cavitators 3 arranged and evenly distributed in the toroidal casing 208 such that the main rotor body 2 will be balanced. Hence, there should preferably be at least two cavitators comprised in the main rotor body 2 distributed equidistant from each other and on the same radial distant from the centre axle 209 being the axis of rotation around which the main rotor body 2 rotates. Each cavitator 3 comprises a cavitator inlet 301 and a cavitator outlet 302 which is located in connection with a main rotor body gas feed openings 210 in the toroidal casing. To be noted, the portion of the toroidal casing 208 which is missing at the location of the cavitator inlet 301 has only been removed in the drawing in order to make the cavitator inlet 301 visible in the drawing and this part is covered by the toroidal casing 208 as shown for the other two cavitators.

Figure 2B:
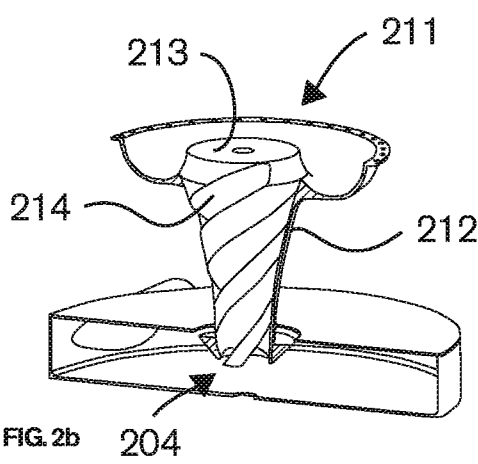

In FIG. 2*b* is disclosed a pump 211 in which the pump casing 212 has been partly removed in order to reveal the pump main body 213 covered by the pump casing 212. The pump main body 213 has been provided with helically shaped cut-outs which together with the pump casing 212 form pump channels which thus form a screw pump, also commonly referred to as an Archimedean screw. The pump 211 is partly submerged into the liquid supply reservoir 104 such that the pump channel inlets 215 are located below the surface level of the liquid in the liquid supply reservoir 104. As the main rotor body 2 starts to rotate, in this case clockwise, liquid will be drawn upwards by the helically screw shaped channels 214 and guided further to the cavitator inlets 301 by the rotational movement of the main rotor body. An additional pumping effect will also arise from the centrifugal forces acting on the liquid as it enters the pump 211. The liquid enters at or close to the centre axle 209 and is thereafter guided upwards and outwards through the pump channels. The pump channels form part of the main rotor body channels 203. As is obvious from FIG. 2*b*, the liquid will follow the helical pattern of the pump channels 214 as the liquid rises up to the level of the toroidal casing 208 where after the channels will continue in an essentially radial direction towards the peripheral parts of the main rotor body 2 having an outlet in the toroidal casing 208 close to the cavitator inlet 301.

Figure 2C:
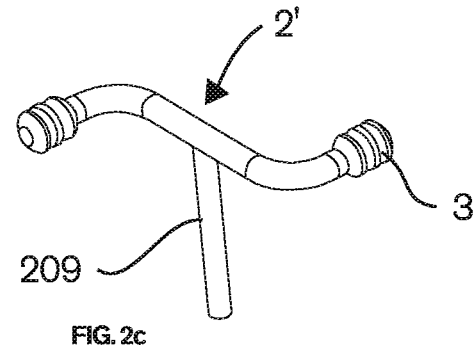

Hence, the above FIGS. 1*a*, 1*b*, 1*c*, and 1*d* and FIGS. 2*a* and 2*b* disclose how a complete system for gasification by cavitation of a liquid may be designed. However, even though the system described have many beneficial features, the overall system according to the invention may be designed in a more simplistic way. In FIG. 2*c* is disclosed how a more basic system according to the invention may be designed. In FIG. 2*c* is simply disclosed a gas generator 1 comprising a main rotor body 2' provided with a centre axle 209 which is provided with a hollow inside forming part of a channel 214 for distribution of a liquid from a channel inlet 204 to a pair of cavitators 3 located at diametrically opposite sides of the rotational axis. The device could be provided with an Archimedean screw or having an additional pump unit but may also be designed without any additional pump equipment and rely on the centrifugal forces acting on the liquid as it flows through the channel214. Hence, the essential features for providing a gas generator 1 according to the invention are disclosed in FIG. 2*c*. In order to function as desired, the gas generator 1 in FIG. 2*c* as well as the gas generator 1 described in FIGS. 1*a*, 1*b*, 1*c*, and 1*d* and FIGS. 2*a* and 2*b*, shall be provided with a cavitator 3 which is designed as a small turbine in order to subject the liquid to further centrifugal forces from additional rotation in the cavitator. An example of the design of such a cavitator 3 will be described below with reference to FIGS. 3a, 3b, 3c, 3d, 3e, and 3f and FIGS. 4a, 4b, 4c, and 4d.

Figure 3A:
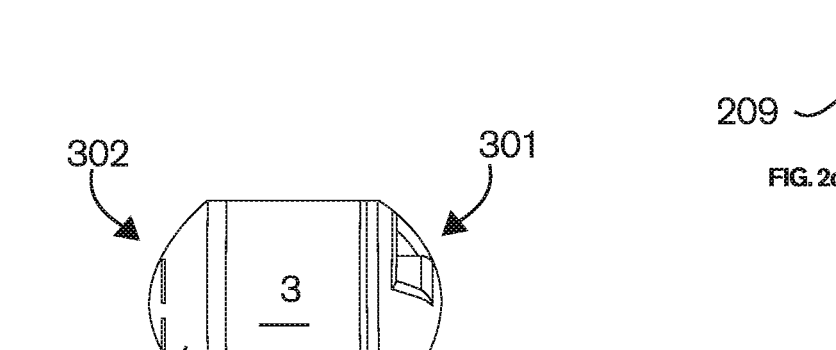
FIGS. 3a, 3b, 3c, 3d, 3e, and 3f disclose an embodiment of a cavitator.

With reference to FIGS. 3a, 3b, 3c, 3d, 3e, and 3f the design of the cavitator 3 will be described. In FIG. 3a is disclosed a cavitator 3 having a generally cylindrical outer shape. A cavitator inlet 301 is located at a first axial end of the cylindrical cavitator 3 and a cavitator outlet 302 at the second, opposite axial end of the cylindrical cavitator 3. There are further disclosed an inlet cap 301a with an inlet opening and an outlet cap 302a provided with outlet openings. The inlet and outlet caps 301a, 301b may be used to direct and control the flow of fluid entering and leaving the cavitator 3. However, the inlet and outlet caps 301a, 302a could be designed different and the cavitator 3 will work also without these caps 301a, 301b. In the following FIGS. 3b, 3c, 3d, and 3e, the caps have therefore been left out.

Figure 3B:
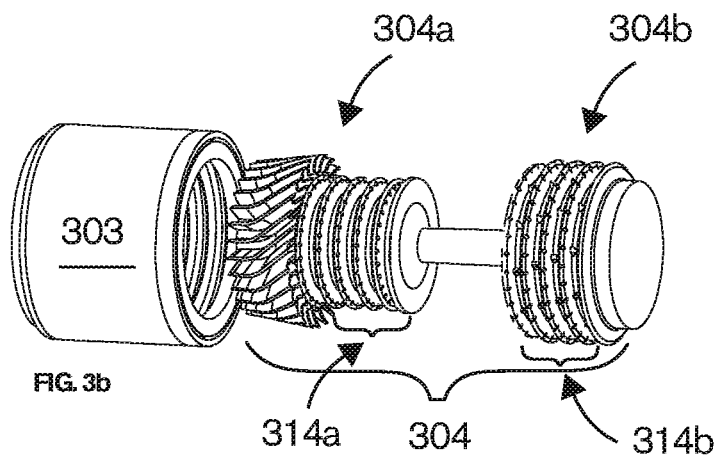

In FIG. 3b is disclosed an exploded view of the cavitator 3 in FIG. 3a but without caps. The cavitator 3 comprises an outer stator 303 which forms a casing into which a cavitator rotor 304 is fitted. The cavitator rotor 304 comprises an inner rotor piece 304a and an outer rotor piece 304b which are designed to fit into each other and at least partly overlap each other in the axial direction.

Figure 3C:
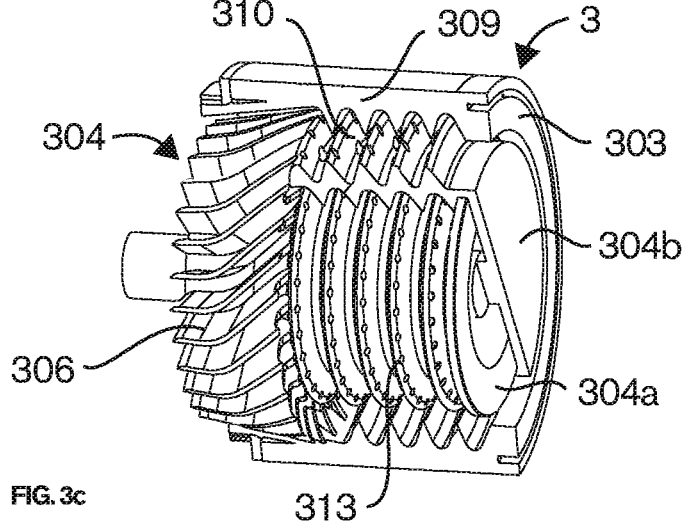

In FIG. 3c is shown a cross sectional view of the cavitator 3 (without caps) wherein a cross sectional cut has been made dividing the cavitator stator 303 in halves along its longitudinal extension. Also the outer rotor piece 304b is shown in a cross sectional view where the cross sectional cut is dividing the outer cavitator rotor 304b in halves along its longitudinal extension. However, the cross sectional cut of the outer cavitator rotor 304b has been rotated somewhat relative the cut of the cavitator stator 303 such that the different parts are more easily recognized.

In the overlapping portion of the inner rotor piece 304a and the outer rotor piece 304b, the outer rotor piece 304b is designed to enclose the inner rotor piece 304a such that there is gap in the radial direction between the inner and outer rotor pieces 304a, 304b. The gap is extending the full circle between the inner and outer rotor pieces 304a, 304b such that an annular shaped void space is created there between. The void space further extends in the longitudinal direction such that an inner cavitator channel 305a is crated forming part of a cavitator channel 305 (see FIGS. 3e and 3f) for a fluid passing through the cavitator 3 from the cavitator inlet 301 to the cavitator outlet 302. In a similar manner, a void space is created in the radial direction between the outer rotor piece 304b and the cavitator stator 303 creating an outer cavitator channel 305b forming part of the cavitator channel 305.

The cavitator rotor in FIG. 3c further comprises rotor blades 306 located close to the cavitator inlet 301. The rotor blades 306 are designed to cause a rotation of the cavitator rotor 304 as the fluid flows through the cavitator 3. The fluid will pass the rotor blades and be directed towards inner cavitator channel inlets 307a and outer cavitator channel inlets 307b (see FIG. 3e). The inner cavitator channel is provided with a closed end 308a while the outer cavitator channel is provided with an outlet 308b close to the end of the cavitator 3 where the cavitator outlet 302 is located. A liquid entering the inner cavitator channel 305a may thus not pass through an outlet at the end of the inner cavitator channel. However, the inner cavitator channel 305 is separated from the outer cavitator channel by an intermediate wall 310 which is provided with capillary vanes 309 connecting the inner cavitator channel 305a with the outer cavitator channel 305b. The fluid entering the inner cavitator channel 305a will thus be directed via the capillary vanes to the outer cavitator channel 305b to be mixed with the flow in the outer cavitator channel 305b to flow towards the outer cavitator channel outlet 308a. The capillary vanes 309 will serve as generators for cavitation of the fluid passing through them. The shape of the capillary vanes 309 disclosed herein has a narrow inlet 311 in the side of the intermediate wall 310 facing towards the inner cavitator channel 305a and is widening towards its outlet 312 in the intermediate wall 310 at its side facing towards the outer cavitator channel 305b. This shape will contribute to cavitation of the fluid passing through the capillary vanes as there will be a reduced pressure as the capillary vane 309 widens towards the capillary outlet 312.

Figure 3D:
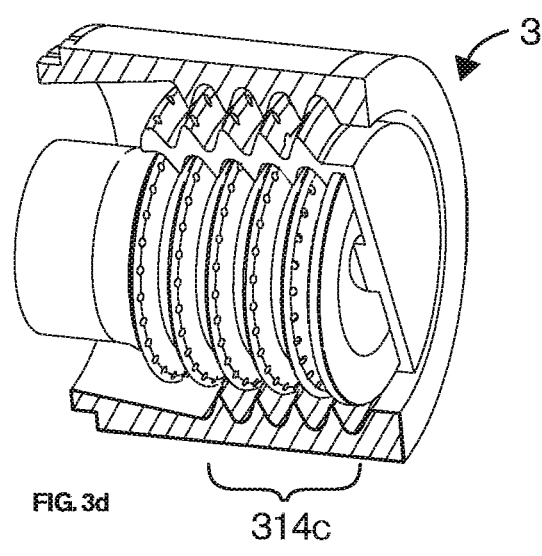
Figure 3E:
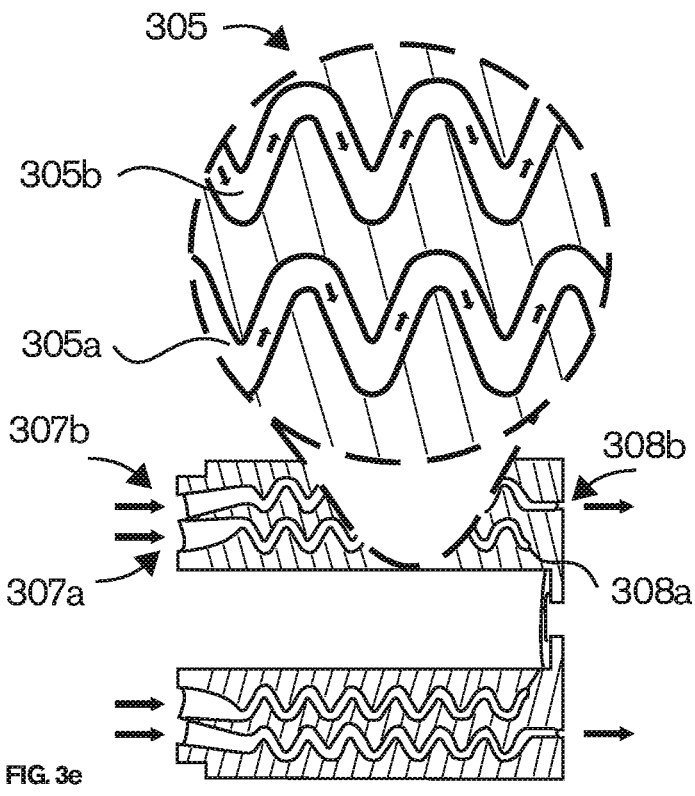
Figure 3F:
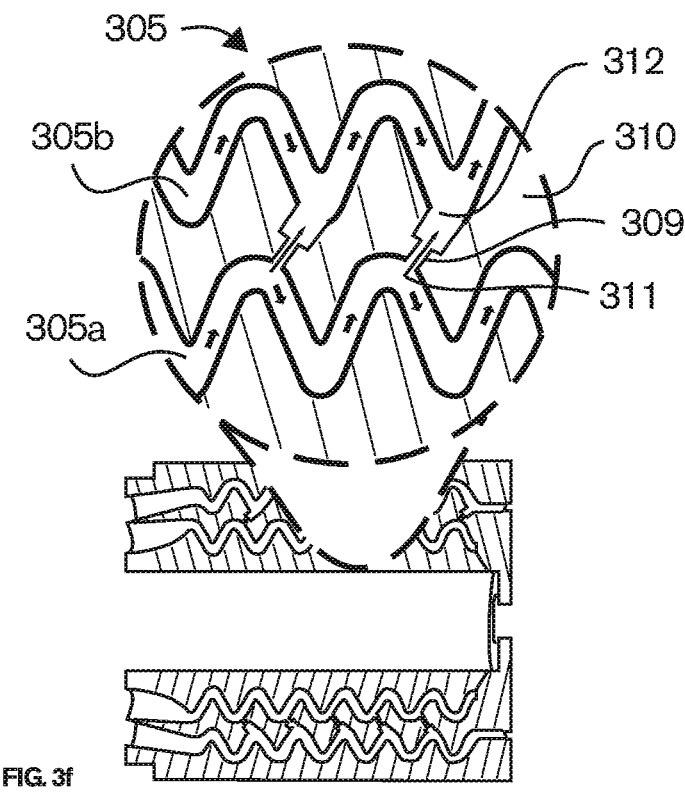

FIGS. 3c and 3d differs in that there are rotor blades 306 provided on the cavitator rotor 304 in FIG. 3c while there are no rotor blades present in FIG. 3d. By designing the capillary vanes adequately they may function as jet streams inducing a rotation of the cavitator rotor 304. Hence, there are not necessarily present rotor blades on the rotor 304 but it may also function with only the impulse from the fluid flowing through the capillary vanes in order to provide a rotation of the rotor.

In addition to the cavitation generated by the passage of the fluid through the capillary vanes 309, also the sinusoidal shape of the cavitator channels 305a, 305b together with the centrifugal forces from the rotation of the cavitator rotor 304 will contribute to an increased cavitation. In addition, there are also provided cavitation generating indentations 313 on the inner wall 314 of the cavitator inner channel 305a also improving the generation of cavitation.

It shall be noted that the explicit design of the cavitator 3 in FIGS. 3a, 3b, 3c, 3d, 3e, and 3f only serves as an example of how cavitator suitably may be designed according to the invention. However, the cavitator could be designed in another way. The important feature of the cavitator is that it is designed to include a cavitator stator 303 and a cavitator rotor such that there will be rotation of the cavitator channel 305 causing the fluid in the channel 305 to be subjected to centrifugal forces from the rotation of the rotor 304. The theoretical theory beyond the design of the cavitator will be further explained in FIGS. 4a, 4b, 4c, and 4d.

Figures 4A, 4B, 4C:
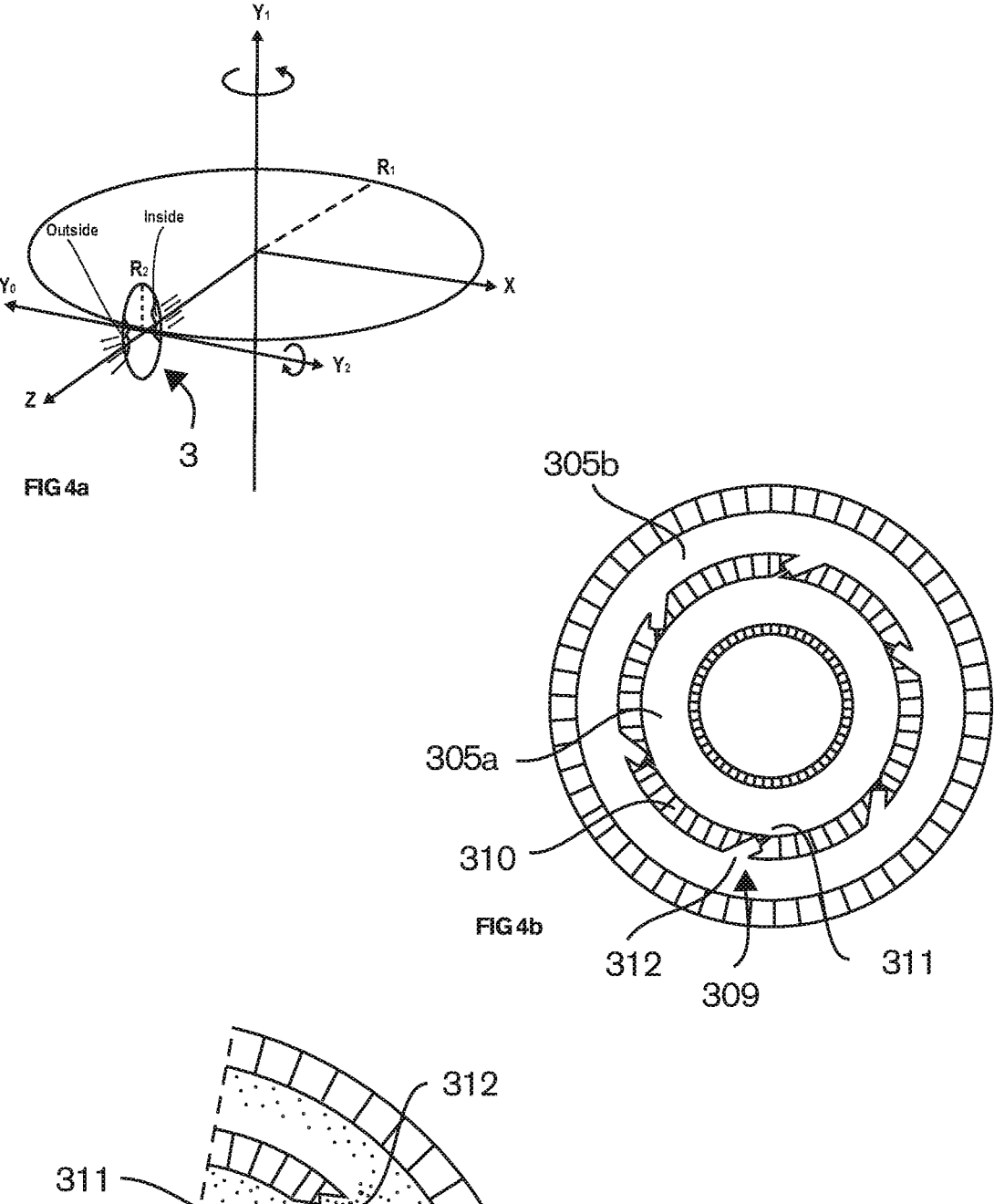
FIGS. 4a, 4b, 4c, and 4d disclose schematically the function of an embodiment of a cavitator.

In FIG. 4a is disclosed how the forces acting on a liquid in a gas generator 1 as disclosed above are created and how they are used in the gas generator. FIG. 4a describes schematically how the cavitator 3 rotates when it is mounted in the main rotor body 2 (see FIGS. 2a, 2b, and 2c). The complete cavitator 3 rotates around the Y1-axis, which is parallel to the centre axle 209 in FIGS. 2a and 2c, and is thus subjected to a first centrifugal force from this first rotation. The cavitator 3, e.g. such a cavitator as disclosed in FIGS. 3a, 3b, 3c, 3d, 3e, and 3f, is further designed and comprised in the system such that the cavitator rotor 304 (see FIGS. 3a, 3b, 3c, 3d, 3e, and 3f) rotates relative the cavitator stator 303 (see FIGS. 3a, 3b, 3c, 3d, 3e, and 3f 3) around a centre axis through the cavitator 3. The centre axis of the cavitator is parallel with the Y0----Y2 axis in FIG. 4a. This second rotation will cause centrifugal forces acting outwards in a direction from the centre axis of the cavitator towards the envelope surface of the cylindrical cavitator all around the cavitator. Due to the construction of the cavitator and how it is integrated in the main rotor body as disclosed in FIGS. 2a and 2c, the centrifugal forces from the first and second rotations will cooperate at different locations in different ways. The centrifugal forces from the first rotation around the Y1-axis will be directed outwards from the Y1-axis in a direction perpendicular to the Y1-axis. The centrifugal forces from the second rotation of the cavitator rotor 304 relative the cavitator stator 303 will be directed outwards from the Y0----Y2-axis in a direction perpendicular to the Y0----Y2-axis. On the outside of the cavitator 3, i.e. the part furthest away from the Y1-axis, the centrifugal forces from the first rotation around the Y1-axis will act in an outward direction from the Y1-axis. At this location, also the centrifugal forces from the second rotation of the cavitator rotor 304 will be directed outward from the Y1-axis. On the inside of the cavitator 3, i.e. the part closest to the Y1-axis, the centrifugal forces from the first rotation around the Y1-axis will still act in an outward direction from the Y1-axis while the centrifugal forces from the second rotation of the cavitator rotor 304 will act in the opposite direction, i.e. towards the Y1-axis. Hence, the resulting centrifugal force from both rotations will change from being totally aligned on the outside to be working in opposite directions on the inside. The resulting force will gradually change and will also work in directions being along the Y1 axis along the circumference of the cavitator. For example, in the mid portion between the outside and inside, the force from the second rotation by the cavitator rotor will be directed along the Y1-axis but in different directions depending on if they are working on the upside or downside.

In FIG. 4b is disclosed a cross sectional view of the cavitator 3 in a plane perpendicular to the centre axis through the cavitator 3, i.e. through the axis being parallel to the Y0----Y2-axis in FIG. 4a. As can be seen in FIG. 4b, the capillary vanes 309 are designed to be slanted in the cavitator rotor intermediate wall 310. The slanted capillary vanes 309 will contribute in providing a rotation of the cavitator rotor 304 (see FIGS. 2a, 2b, and 2c) when a liquid is forced to flow through the capillary vanes 309 from the inner cavitator channel 305a to the outer cavitator channel 305b. The liquid flowing through the capillary vanes 309 will enter via a rather narrow capillary vane inlet 311 in the inner cavitator channel 305a and will be exhausted from a rather wide capillary vane outlet 312 in the outer cavitator channel 305b. The design of the capillary vanes 309 having a narrow inlet 311 and a wide outlet 312 will contribute to cavitation of a liquid passing through the capillary vanes 309.

Figure 4D:
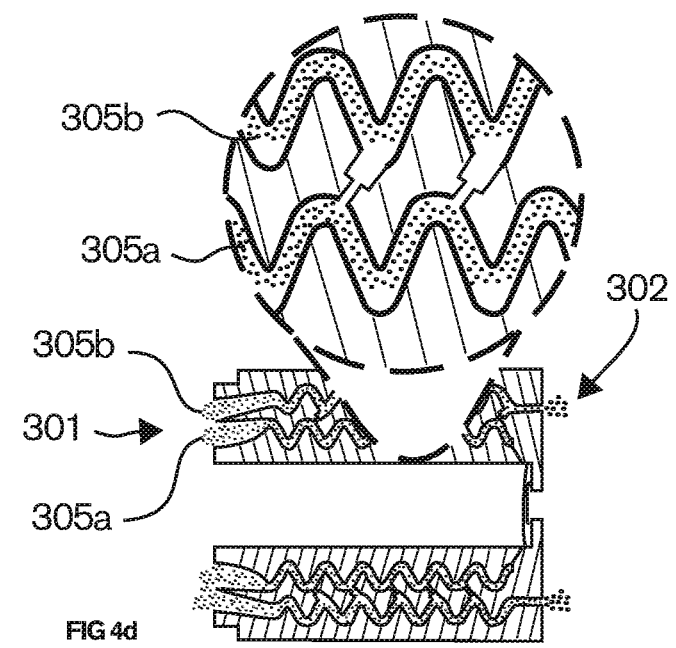

In FIGS. 4c and 4d is schematically disclosed how the mechanism of cavitation function in the cavitator 3. In FIG. 4c is disclosed how a liquid passing through the capillary vane 309 will cavitate due to the pressure difference created from having a narrow capillary vane inlet 311 and a wide capillary vane outlet 312. As the liquid flows through the capillary vane, the pressure reduction occurring when the liquid the narrow capillary vane inlet portion and entering the capillary vane outlet portion will cause some of the liquid to transform to gas phase and thus creates bubbles in the liquid flow passing through the capillary vanes 309. The creation of bubbles by cavitation is schematically disclosed in FIG. 4c where the somewhat larger dots in the capillary vane outlet 312 zone represents molecules of a fluid which have cavitated and expanded from being in liquid phase to be in gas phase. As these molecules continue to flow into the liquid flow in the outer cavitator channel 305b, the gas phase bubbles will implode and form part of the liquid flow in the outer channel 305b. In FIG. 4d is schematically disclosed a pressure profile in the cavitator 3 where the dots are intended to represent fluid molecules. As can be seen in FIG. 4d, the curved regions of the wave shaped inner and outer channels 305a, 305b closest to the centre rotation axis of the cavitator 3 have a less dense pattern of molecules indicating a lower pressure in these regions. In particular, the capillary vane outlet 312 zone has a very sparse occurrence of molecules indicating a very low pressure. A fluid entering the cavitator channel inlet 301 as a liquid will thus flow via the cavitator inner and outer channels 305a, 305b where the liquid will start to cavitate in the wave shaped channels 305a, 305b and be guided further to the cavitator outlet 302 where the fluid will expand to form a gas phase when leaving the cavitator.

Figure 5:
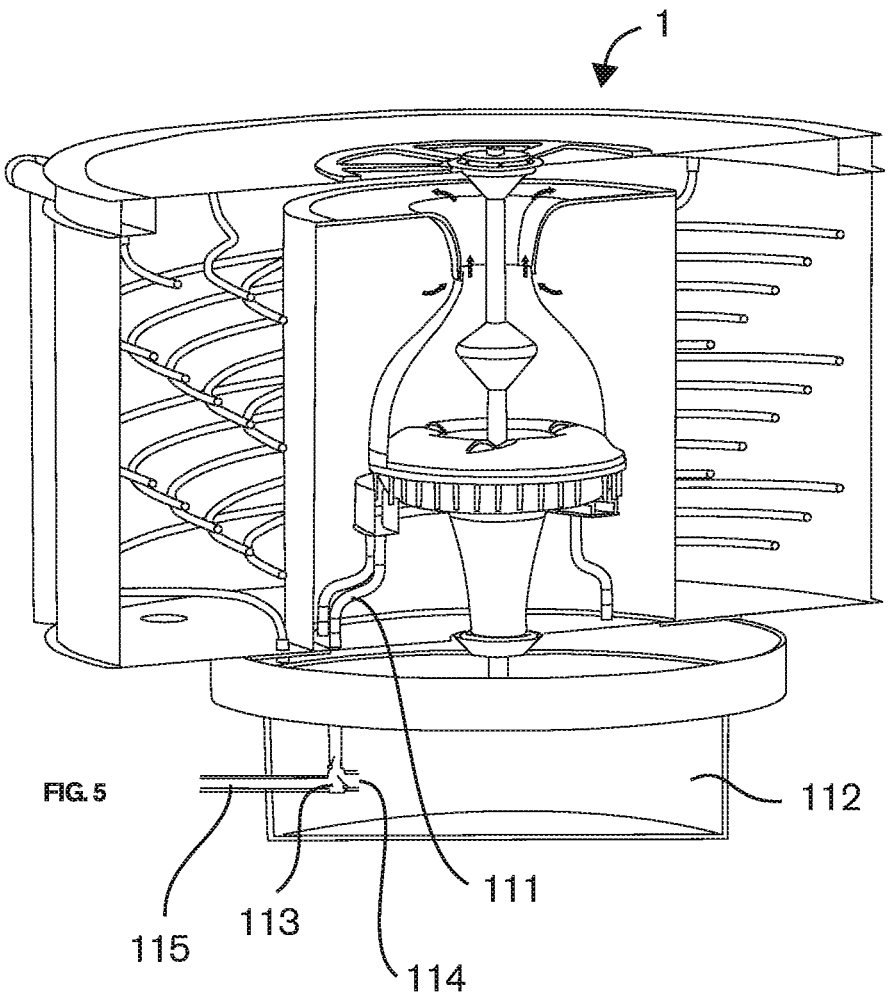
FIG. 5 discloses a gas generator comprising a waste collection tank.

In FIG. 5 is disclosed how the gas generator 1 according to an embodiment have been provided with a waste collector tank 112 to which the liquid waste conduits 111 are connected in order to collect the waste flow from the main rotor body space 202. The waste conduit 111 is provided with a waste conduit valve arrangement 113 in order to control the flow to and from the waste collector tank. The valve arrangement 113 is important in order to be able to switch the collector tank 112 from being in a first filling mode when the waste collector tank 112 is filled up with waste liquid and a second discarding mode when the waste liquid is discarded from the tank. In the first filling mode, the valve arrangement 113 is set to allow waste liquid from the main rotor drainage outlet 207 to flow into the waste collector tank 112 via a waste tank pipe 114 while the outlet pipe 115 is closed. When the mode is switched to the second discarding mode, the waste conduit valve arrangement 113 should first be set to close the inlet flow from the rotor drainage outlet 207 where after the outlet pipe 115 is opened up and allow the waste liquid to be discarded from the waste tank 112 via the waste tank pipe 114 to the outlet pipe 115.

During the first filling mode will the waste collector tank 112 be connected to the main rotor drainage outlet 207 via the liquid waste conduits 111 and will thus have the same pressure as in the inner container space 108. As previously explained, the pressure in the inner container space will be close to vacuum or at least considerably below the surrounding normal atmospheric pressure where the gas generator 1 is located. Due to the low pressure in the tank when in filling mode, the control of the valves to be opened and closed in the right order is essential to avoid a sudden pressure fluctuation in the waste collector tank 112. Hence, the valve arrangement 113 should be controlled to never allow the waste liquid conduits 111 to be open at the same time as the outlet pipe 115 is open in order to reduce possible pressure fluctuations in the inner container space 108. The low pressure generated and maintained in the inner container space 108 is generated due to the high velocity flow of gas generated by the cavitators 3 attached to the main rotor body 2. The high velocity gas will leave the cavitators 3 via the main rotor body gas feed openings 210 in the toroidal casing and enter the main rotor body space 202. The gas will flow towards the main rotor body outlet 205 while passing by a flow restrictor 206. The flow restrictor 206 will, together with the funnel shaped outlet, cause the flow of gas to hit wither the flow restrictor 206 or the walls of the main rotor body casing 201 causing impurities and particles withdrawn by the gas to flow downwards along the walls of the main rotor body casing 201. The gas will continue to flow through the funnel shaped outer container space gas inlet 109 and flow through the outer container space 105 and thus passing the transfer conduits 103 such that there will be a heat exchange between the hot gas and the liquid flowing in the transfer conduits 103. Preferably the heat exchanging is controlled such that the gas will condense and be collected as liquid at the bottom wall 101c of the outer casing 101 in order to be guided to the container outlet 107. The container outlet 107 may be connected to a piping system for further transport of the condensed gas in the piping system or having a tap for filling up storage tanks.

The invention claimed is:

1. A cavitator to be used in a gas generator, the cavitator comprising an outer cavitator stator and an inner cavitator rotor, the inner cavitator rotor arranged to rotate relative to the outer cavitator stator, wherein said cavitator is provided with a cavitator inlet and a cavitator outlet, said cavitator further comprising cavity channels including an inner cavitator channel and an outer cavitator channel each running along an axis of rotation of the inner cavitator rotor and having a cavitator channel inlet and a cavitator channel outlet, said cavitator channels provided with cavitation inducing means for inducing a differentiated pressure within a liquid flowing through the cavitator, said cavitator being arranged to induce a rotation of the inner cavitator rotor by a liquid flow through the cavitator such that the rotation of the inner cavitator rotor will induce a differentiated pressure within the liquid in the cavitator promoting cavitation in the liquid flowing through the cavitator channels, wherein the inner cavitator channel is located closer to the axis of rotation of the inner cavitator rotor than the outer cavitator channel, the inner cavitator channel is formed between a first innermost wall and a second middle wall in the cavitator forming a first inner flow path for a fluid, the outer cavitator channel is formed between said second middle wall and a third outermost wall in the cavitator forming a second outer flow path for the fluid, and the first, first innermost wall and the second middle wall in the cavitator form part of the inner cavitator rotor while the third outermost wall in the cavitator forms part of the outer cavitator stator.

2. The cavitator according to claim 1 wherein said cavitator channels are designed to be wave-, saw tooth- or curvilinear shaped.

3. The cavitator according to claim 2 wherein the cavitator channels are designed to be shaped as sinusoidal curves.

4. The cavitator according to claim 1 wherein there are capillary vanes between the inner cavitator channel and the outer cavitator channel.

5. The cavitator according to claim 4 wherein the capillary vanes are designed to function as jets for causing a rotational movement of the inner cavitator rotor.

6. The cavitator according to claim 4 wherein said capillary vanes comprise a capillary vane inlet and a capillary vane outlet which are designed such that the capillary vane inlet is narrower than the capillary vane outlet to create a change of the pressure within the fluid passing through the capillary vanes.

7. The cavitator according to claim 6 wherein cavities are between the capillary vane inlet and the capillary vane outlet.

8. The cavitator according to claim 4 wherein the inner cavitator channel is provided with a dead end causing the flow of liquid entering the inner cavitator channel inlet to pass through the capillary vanes from the inner cavitator channel to the outer cavitator channel.

9. The cavitator according to claim 4 wherein said outer cavitator channel is designed to have a width adapted to provide a sufficient distance for the gas bubbles formed by cavitation of the fluid, when flowing from the inner cavitator channel via the capillary vanes to the outer cavitator channel, to collapse inside the fluid before the cavitation bubbles reaches the third, outermost wall in the cavitator.

10. A gas generator for gasification of liquids, said gas generator comprising a main rotor body being rotatably mounted to a static support framework such that the main rotor body is arranged to rotate around a rotor body centre axle, said main rotor body comprising one or several main rotor body channels, provided with a rotor body channel inlet and a rotor body channel outlet, for guiding a flow of a liquid from said rotor body channel inlet being located at a distance R1 in the radial direction from the rotor body centre axle towards said rotor body channel outlet being located at a distance R2 in the radial direction from the rotor body centre axle, wherein R2>R1 such that a liquid in the rotor body channel is forced from the rotor body channel inlet towards the rotor body channel outlet by centrifugal forces as the main rotor body rotates around the rotor body centre axle, said main rotor body further comprising at least one cavitator, each cavitator comprising an outer cavitator stator and an inner cavitator rotor, said inner cavitator rotor arranged to rotate relative to said outer cavitator stator, each cavitator is provided with a cavitator inlet and a cavitator outlet, each cavitator further comprising cavitator channels including an inner cavitator channel and an outer cavitator channel each running along an axis of rotation of the inner cavitator rotor and having a cavitator channel inlet and a cavitator channel outlet, said cavitator channels provided with cavitation inducing means for inducing a differentiated pressure within a liquid flowing through the cavitator, said cavitator being arranged to induce a rotation of the inner cavitator rotor by a liquid flow through the cavitator such that the rotation of the inner cavitator rotor will induce a differentiated pressure within the liquid in the cavitator promoting cavitation in the liquid flowing through the cavitator channels, said cavitator channel inlet being connected to the rotor body channel outlet for guiding said liquid flow to the cavitator for cavitation of the liquid, wherein the inner cavitator channel is located closer to the axis of rotation of the inner cavitator rotor than the outer cavitator channel, the inner cavitator channel is formed between a first innermost wall and a second middle wall in the cavitator forming a first inner flow path for a fluid, the outer cavitator channel is formed between said second middle wall and a third outermost wall in the cavitator forming a second outer flow path for the fluid, and the first innermost wall and the second middle wall in the cavitator form part of the inner cavitator rotor while the third outermost wall in the cavitator forms part of the outer cavitator stator.

11. The gas generator according to claim 10 wherein said main rotor body comprises at least two cavitators being located equidistant from each other and equidistant from the rotor body centre axle.

12. The gas generator according to claim 10 wherein the main rotor body comprises a main rotor body casing defining a rotatable container having an interior main rotor body space to which a vaporized liquid is guided from the cavitators.

13. The gas generator according to claim 10 wherein said main rotor body is comprised in an inner casing forming part of the static support framework, said inner casing being used as a pressure chamber.

14. A gas generator for gasification of liquids, the gas generator comprising a main rotor body being rotatably mounted to a static support framework such that the main rotor body is arranged to rotate around a rotor body centre axle, the main rotor body comprising one or several main rotor body channels, provided with a rotor body channel inlet and a rotor body channel outlet, for guiding a flow of a liquid from the rotor body channel inlet being located at a distance R1 in the radial direction from the rotor body centre axle towards the rotor body channel outlet being located at a distance R2 in the radial direction from the rotor body centre axle, wherein R2>R1 such that a liquid in the rotor body channel is forced from the rotor body channel inlet towards the rotor body channel outlet by centrifugal forces as the main rotor body rotates around the rotor body centre axle, the main rotor body further comprising at least one cavitator, each cavitator comprising an outer cavitator stator and an inner cavitator rotor, the inner cavitator rotor arranged to rotate relative to the outer cavitator stator, each cavitator is provided with a cavitator inlet and a cavitator outlet, each cavitator further comprising cavitator channels including an inner cavitator channel and an outer cavitator channel each having a cavitator channel inlet and a cavitator channel outlet, the cavitator channels provided with cavitation inducing means for inducing a differentiated pressure within a liquid flowing through the cavitator, the cavitator being arranged to induce a rotation of the inner cavitator rotor by a liquid flow through the cavitator such that the rotation of the inner cavitator rotor will induce a differentiated pressure within the liquid in the cavitator promoting cavitation in the liquid flowing through the cavitator channels, the cavitator channel inlet being connected to the rotor body channel outlet for guiding the liquid flow to the cavitator for cavitation of the liquid, wherein the inner cavitator channel is formed between a first innermost wall and a second middle wall in the cavitator forming a first inner flow path for a fluid, and the outer cavitator channel is formed between the second middle wall and a third outermost wall in the cavitator forming a second outer flow path for the fluid.

15. The gas generator according to claim 14 wherein the cavitator channels are designed to be wave-, saw tooth- or curvilinear shaped.

16. The gas generator according to claim 15 wherein the cavitator channels are designed to be shaped as sinusoidal curves.

17. The gas generator according to claim 14 wherein there are capillary vanes between the inner cavitator channel and the outer cavitator channel.

18. The gas generator according to claim 17 wherein the capillary vanes comprise a capillary vane inlet and a capillary vane outlet which are designed such that the capillary vane inlet is narrower than the capillary vane outlet to create a change of the pressure within the fluid passing through the capillary vanes.

19. The gas generator according to claim 17 wherein the inner cavitator channel is provided with a dead end causing the flow of liquid entering the inner cavitator channel inlet to pass through the capillary vanes from the inner cavitator channel to the outer cavitator channel.

* * * * *